United States Patent
Mullen et al.

(10) Patent No.: US 10,494,032 B2
(45) Date of Patent: Dec. 3, 2019

(54) VEHICLE CROSS-CAR BEAM

(71) Applicant: Ford Global Technologies, LLC, Dearborn, MI (US)

(72) Inventors: Gary D. Mullen, Plymouth, MI (US); Nicholas Andrew Mazzocchi, Ann Arbor, MI (US); Dan Busuioc, Dearborn, MI (US); Alan Perelli, Plymouth, MI (US); Anthony Ligi, Jr., Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/846,442

(22) Filed: Dec. 19, 2017

(65) Prior Publication Data

US 2019/0185067 A1    Jun. 20, 2019

(51) Int. Cl.
| | |
|---|---|
| *B60J 7/00* | (2006.01) |
| *B62D 25/14* | (2006.01) |
| *B60R 16/02* | (2006.01) |
| *B62D 29/04* | (2006.01) |

(52) U.S. Cl.
CPC ........ *B62D 25/145* (2013.01); *B60R 16/0207* (2013.01); *B62D 29/041* (2013.01)

(58) Field of Classification Search
CPC .... B62D 35/001; B62D 25/168; B62D 25/18; B62D 35/00; B62D 25/145; B62D 25/142; B02C 15/001; B60K 37/00; B61D 3/16; B61D 45/003
See application file for complete search history.

(56) References Cited

U.S. PATENT DOCUMENTS

| | | | | |
|---|---|---|---|---|
| 4,733,739 A * | 3/1988 | Lorenz | ............... | B60H 1/00028 180/90 |
| 5,311,960 A * | 5/1994 | Kukainis | ............... | B60R 21/045 180/90 |
| 5,676,216 A * | 10/1997 | Palma | ................ | B60H 1/00028 180/90 |
| 5,762,395 A * | 6/1998 | Merrifield | .......... | B60H 1/00028 180/90 |
| 5,934,744 A * | 8/1999 | Jergens | ................ | B62D 25/145 296/192 |
| 6,276,740 B1 * | 8/2001 | Mellor | ................... | B21D 39/04 280/90 |
| 6,447,041 B1 * | 9/2002 | Vandersluis | ......... | B60H 1/0055 296/203.02 |
| 6,560,872 B2 * | 5/2003 | Morrison | ............. | B62D 25/145 29/458 |
| 6,668,513 B2 * | 12/2003 | Roberts | ................ | B62D 25/145 296/205 |
| 7,040,686 B2 * | 5/2006 | Kapteyn | ................ | B60K 35/00 248/27.3 |
| 7,264,295 B2 * | 9/2007 | Vander Sluis | ....... | B62D 25/145 180/90 |
| 7,303,219 B2 | 12/2007 | Trabant et al. | | |

(Continued)

*Primary Examiner* — Kiran B Patel
(74) *Attorney, Agent, or Firm* — Vichit Chea; Price Heneveld LLP

(57) ABSTRACT

A cross-car beam is provided herein. The cross-car beam includes a composite elongated panel extending across a vehicle. A bracket is operably coupled with an elongated panel. An attachment feature and a cowl attachment structure are each integrally formed with the bracket and are disposed at opposing end portions of the bracket.

10 Claims, 10 Drawing Sheets

(56) References Cited

U.S. PATENT DOCUMENTS

| | | | |
|---|---|---|---|
| 7,370,500 B2 * | 5/2008 | Kapteyn | B60K 35/00 248/27.3 |
| 7,604,278 B2 * | 10/2009 | Penner | B62D 25/145 180/90 |
| 7,677,649 B2 | 3/2010 | Hedderly | |
| 7,731,261 B2 * | 6/2010 | Wenzel | B29C 45/006 180/90 |
| 8,424,207 B2 * | 4/2013 | Nakano | B22C 9/22 164/129 |
| 8,474,902 B2 * | 7/2013 | Malek | B62D 25/145 296/193.02 |
| 8,915,530 B2 | 12/2014 | Wagner et al. | |
| 8,925,993 B2 * | 1/2015 | Noah-Navarro | B60H 1/00535 296/193.02 |
| 9,162,714 B2 * | 10/2015 | Maier | B62D 29/004 |
| 9,174,537 B1 * | 11/2015 | Webb | B60K 37/00 |
| 9,186,993 B1 * | 11/2015 | Webb | B60K 37/00 |
| 9,193,394 B1 * | 11/2015 | Bharathan | B29C 45/0005 |
| 9,205,721 B2 * | 12/2015 | Herr-Rathke | B62D 25/08 |
| 9,434,095 B2 * | 9/2016 | Marchetti | B29C 45/16 |
| 9,446,540 B2 * | 9/2016 | Marchetti | B29C 44/0461 |
| 9,688,005 B2 * | 6/2017 | Bharathan | B60K 37/00 |
| 2003/0034672 A1 * | 2/2003 | Nagy | B62D 25/145 296/203.02 |
| 2004/0108744 A1 * | 6/2004 | Scheib | B62D 25/142 296/70 |
| 2004/0262954 A1 * | 12/2004 | Scheib | B62D 25/142 296/193.02 |
| 2011/0245950 A1 | 10/2011 | Overton | |
| 2014/0125086 A1 * | 5/2014 | Da Costa Pito | B62D 25/145 296/72 |
| 2014/0319879 A1 * | 10/2014 | Reese | B29C 70/32 296/193.02 |
| 2015/0145275 A1 * | 5/2015 | Baudard | B62D 25/145 296/72 |
| 2015/0151793 A1 * | 6/2015 | Appasamy | B62D 25/145 296/72 |
| 2018/0290515 A1 * | 10/2018 | Marchetti | B32B 27/34 |

\* cited by examiner

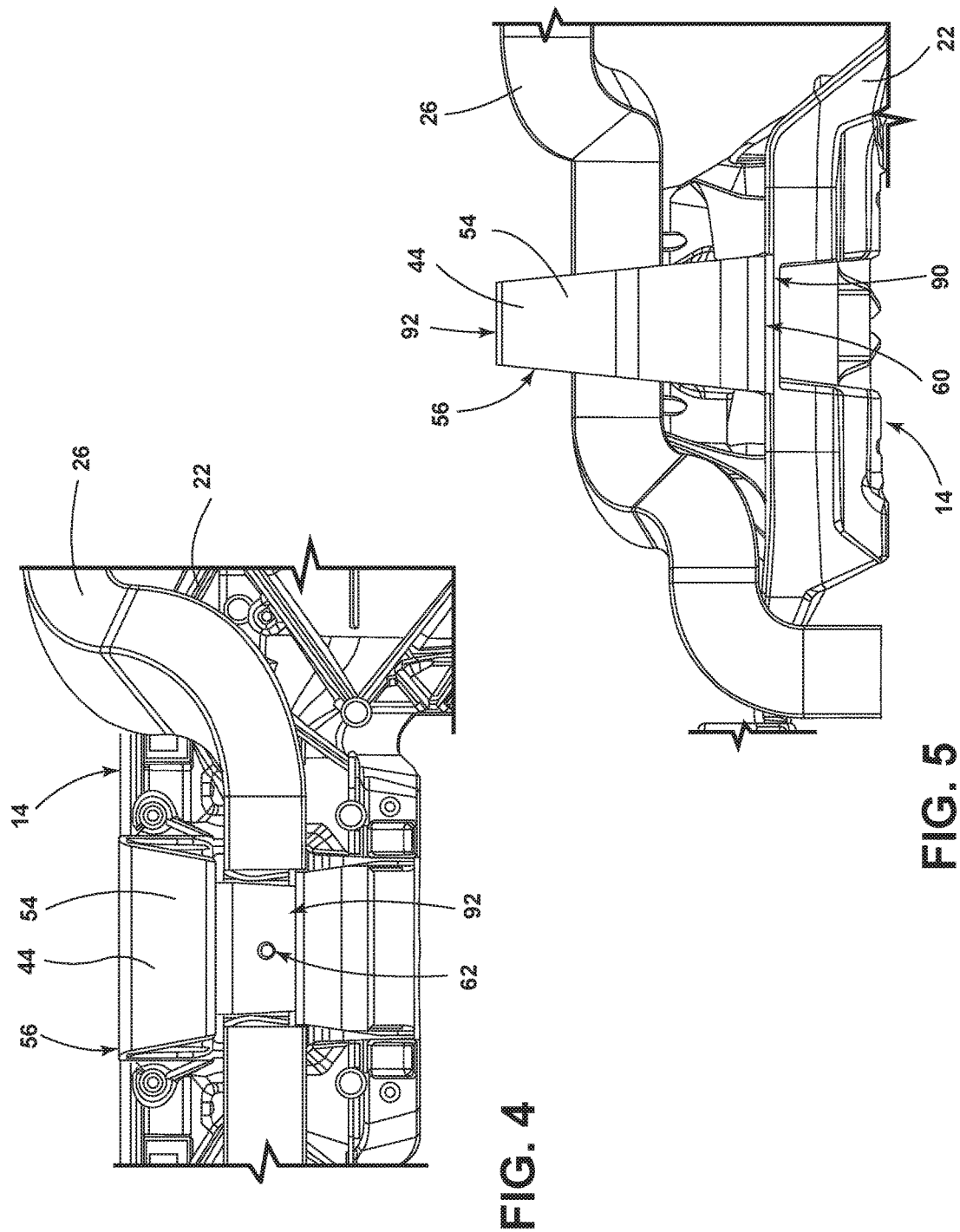

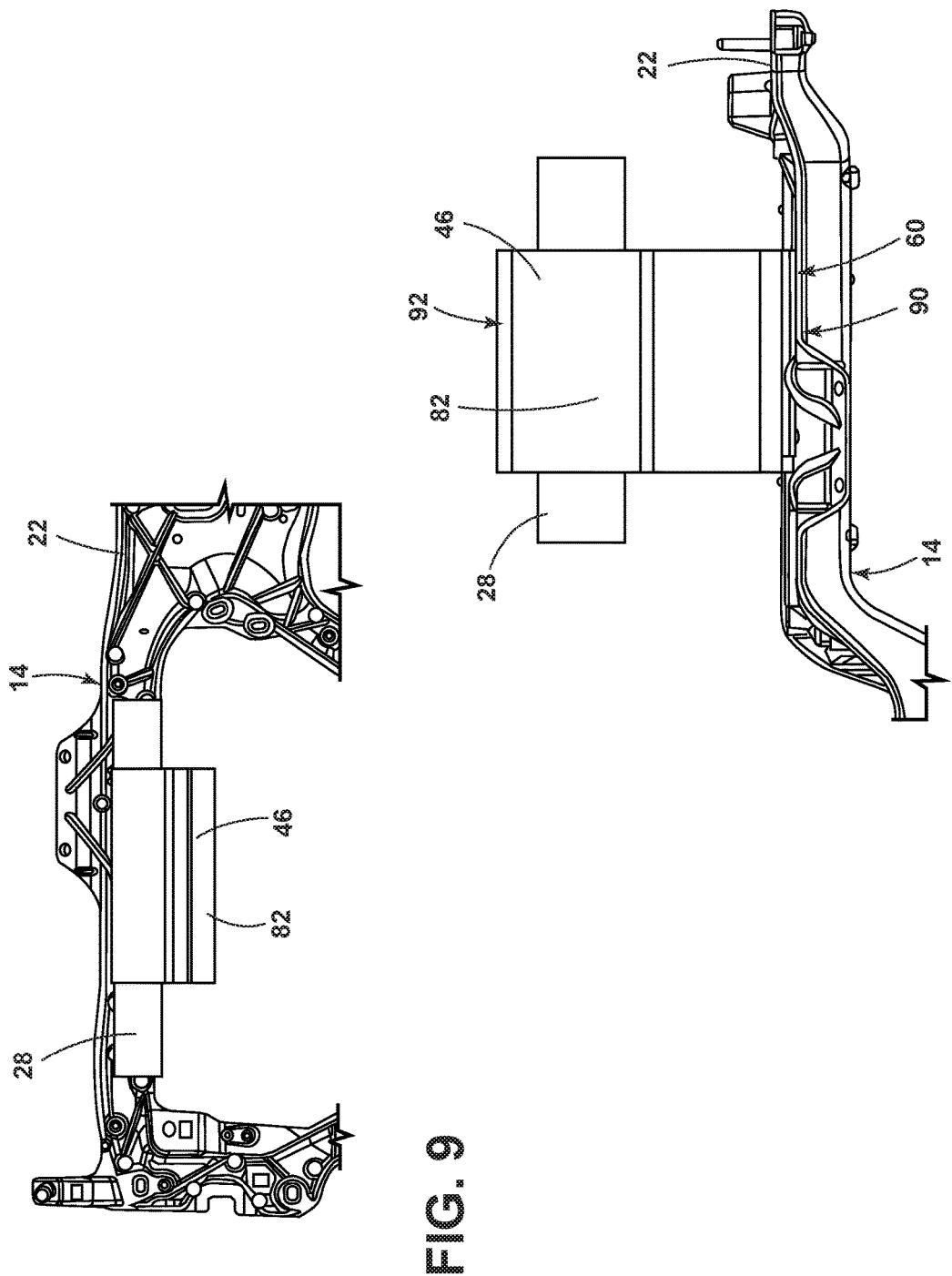

VEHICLE CROSS-CAR BEAM

FIELD OF THE DISCLOSURE

The present disclosure generally relates to a cross-car beam for a vehicle, and more particularly, to a cross-car beam to support a vehicle instrument panel.

BACKGROUND OF THE DISCLOSURE

Conventional cross-car beams support a vehicle instrument panel and are typically manufactured from metal components welded or adhered together. The resulting assembly is both heavy and restrictive in design. Accordingly, there is a need for a lightweight cross-car beam and method of manufacture that imparts greater design flexibility without sacrificing structural integrity. The present disclosure is intended to satisfy this need.

SUMMARY OF THE DISCLOSURE

According to a first aspect of the present disclosure, a cross-car beam is provided herein. The cross-car beam includes a composite elongated panel extending across a vehicle. A bracket is operably coupled with the elongated panel. An attachment feature and a cowl attachment structure are each integrally formed with the bracket and are disposed at opposing end portions of the bracket.

According to a second aspect of the present disclosure, a cross-car beam is provided herein. The cross-car beam includes a composite elongated panel extending across a vehicle. A first bracket is operably coupled with an elongated panel on a first side of a vehicle centerline. A second bracket is operably coupled with the elongated panel on a second side of a vehicle centerline. The first and second brackets include respective first and second housings each having a closed outer periphery.

According to a third aspect of the present disclosure, a vehicle cross-car beam bracket is provided herein. The vehicle cross-car beam bracket includes a housing having a closed outer periphery. An attachment feature and a cowl attachment structure are each integrally formed with the housing and are disposed at opposing end portions of the housing. Integrally formed ribs are disposed within the housing. A first opening is defined by the housing and is configured to accept a duct therethrough.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is partial perspective view of a vehicle forward side of the cross-car beam, according to some examples, having a first bracket coupled to the cross-car beam;

FIG. 5 is top partial perspective view of the cross-car beam having the first bracket coupled to the cross-car beam, according to some examples;

FIG. 9 is a plan view of the vehicle forward side of the cross-car beam and the second bracket, according to some examples;

FIG. 10 is a top plan view of the cross-car beam and the second bracket, according to the example illustrated in FIG. 9;

DETAILED DESCRIPTION OF THE PREFERRED EXAMPLES

Figure 1:
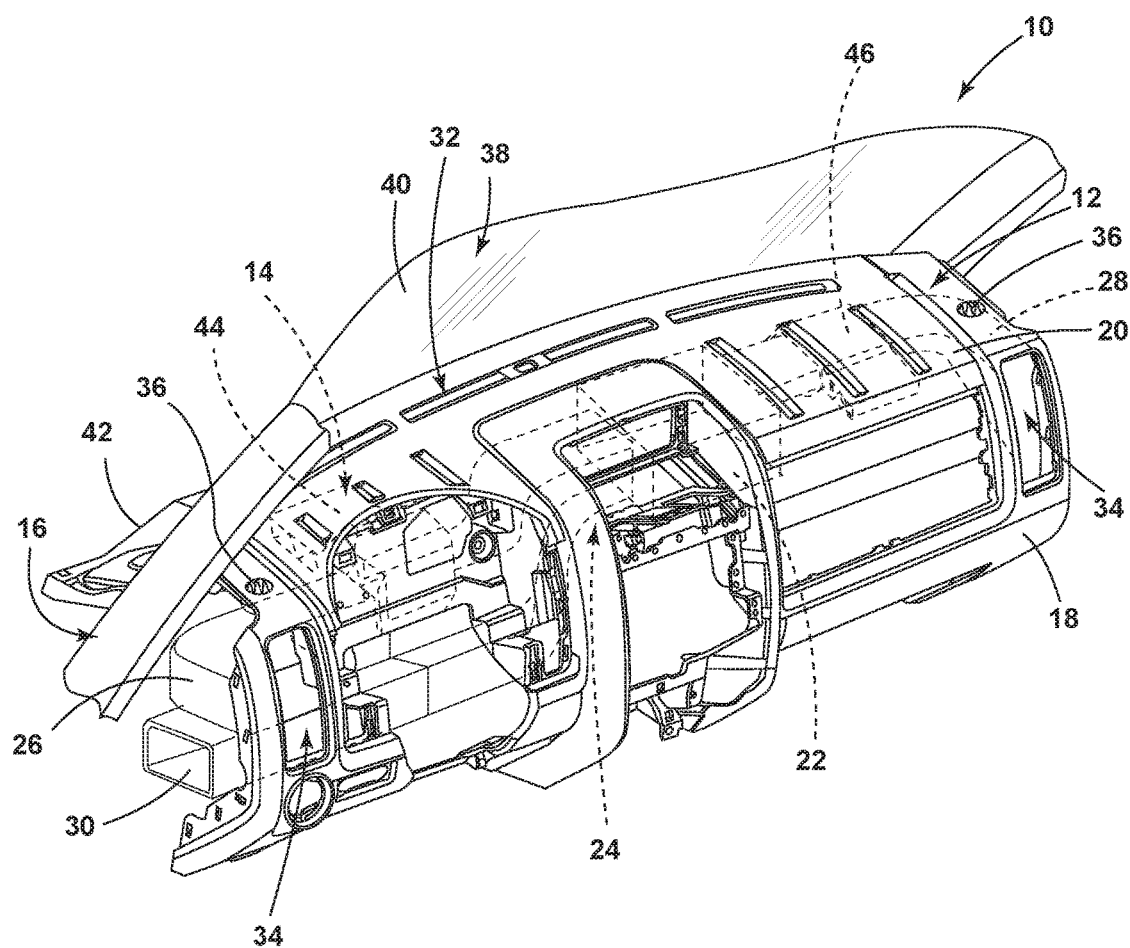
FIG. 1 is a perspective view of a vehicle instrument panel, a windshield, and a cross-car beam, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a cross-car beam for a vehicle. The cross-car beam may include a cross-car beam and one or more brackets coupled with the cross-car beam. The one or more brackets may be formed from a composite material. Moreover, the one or more brackets may include integrally formed retaining features that couple the one or more brackets to the cross-car beam and/or another vehicle structure, such as a cowl.

Referring to FIG. 1, a vehicle 10 includes an instrument panel 12 and a cross-car beam 14 that may capable of resisting, for example, deflection, torsion, and vibration through attachment to a body structure 16 of the vehicle 10. The instrument panel 12 may include a substrate 18 and a cover 20 (upper substrate or topper). The cross-car beam 14 may be formed from an elongated panel 22 and include one or more brackets 44, 46. The cross-car beam 14 is configured to support the instrument panel 12. The substrate 18 of the instrument panel 12 may carry various elements such as driver instrumentation, climate control components, entertainment components, storage compartments, and airbag devices.

With further reference to FIG. 1, a heating, ventilation, air conditioning (HVAC) unit 24 may also be operably coupled to the cross-car beam 14 and/or the instrument panel 12. The HVAC unit 24 may include a plurality of ducts 26, 28, 30 that operably couple to a defroster nozzle outlet 32, an air vent 34, and/or a demister outlet 36. The defroster nozzle outlet 32 may be configured to direct air along an interior surface 38 of a windshield 40. The air vent may direct air from the HVAC unit 24 to various locations along the instrument panel 12. The demister outlet 36 may be configured to direct air towards one or more side windows of the vehicle 10.

The cross-car beam 14 supports the instrument panel 12 and mounts with a cowl 42 through one or more brackets 44, 46. In some examples, the cowl is part of the body structure 16 of the vehicle 10. Through the coupling of the one or more brackets 44, 46 to the cross-car beam 14 and the cowl 42, the cowl 42 provides support for the instrument panel 12. In some examples, the windshield 40 may also rest within cowl 42. It will be appreciated that the instrument panel 12, the one or more brackets 44, 46, the cross-car beam 14, and the HVAC unit 24 may be manufactured and assembled in any suitable fashion without departing from the scope of the present disclosure.

Referring still to FIG. 1, one or more passenger airbags, a steering column, a steering wheel, and/or a glove compartment may be operably coupled with the cross-car beam 14 and/or the instrument panel 12. However, it will be understood that the cross-car beam 14 may additionally or alternatively support other loads if desired. In addition to providing support for a variety of vehicle components, the cross-car beam 14 also functions to provide stability to the vehicle 10 and resist compressive forces caused by vehicle impact.

Figure 2:
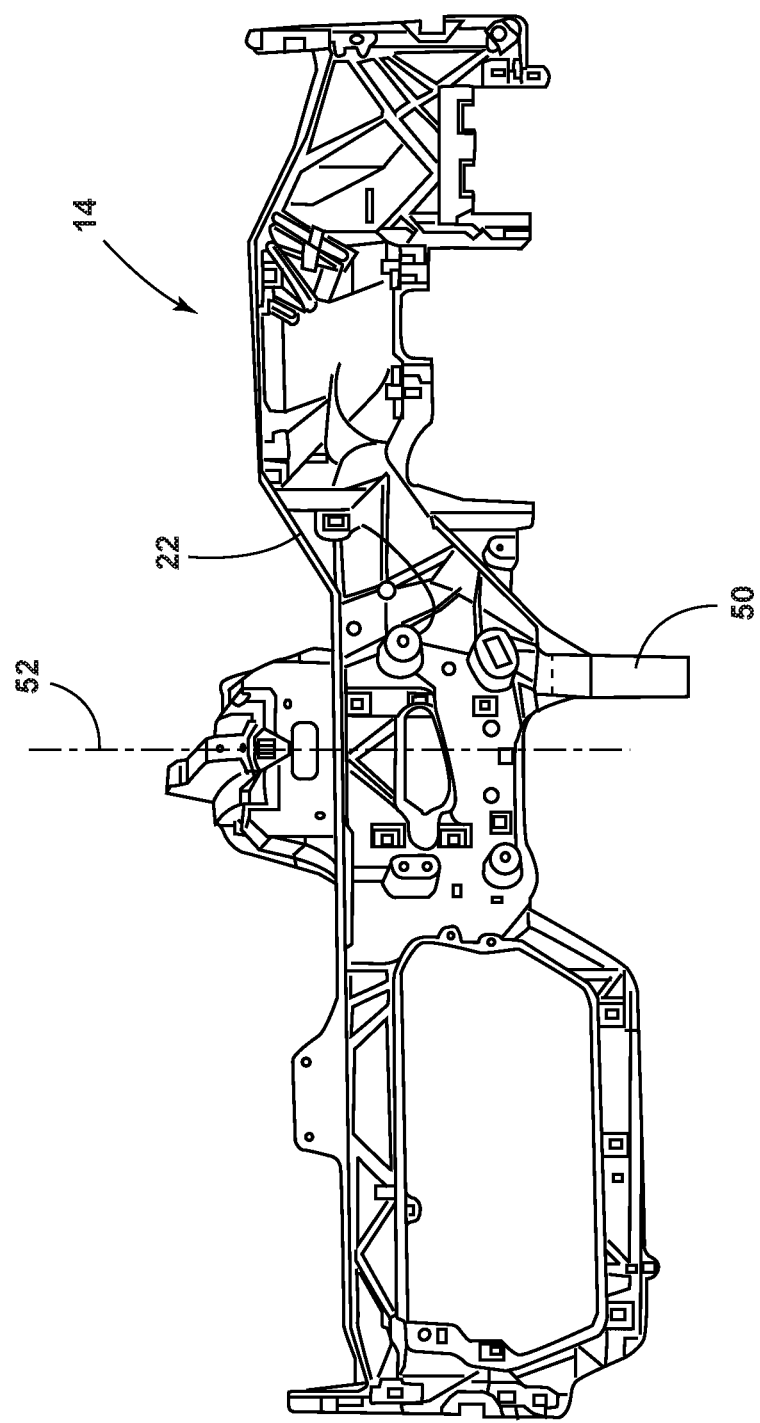
FIG. 2 is a plan view of a vehicle forward side of a cross-car beam, according to some examples.
Figure 3:
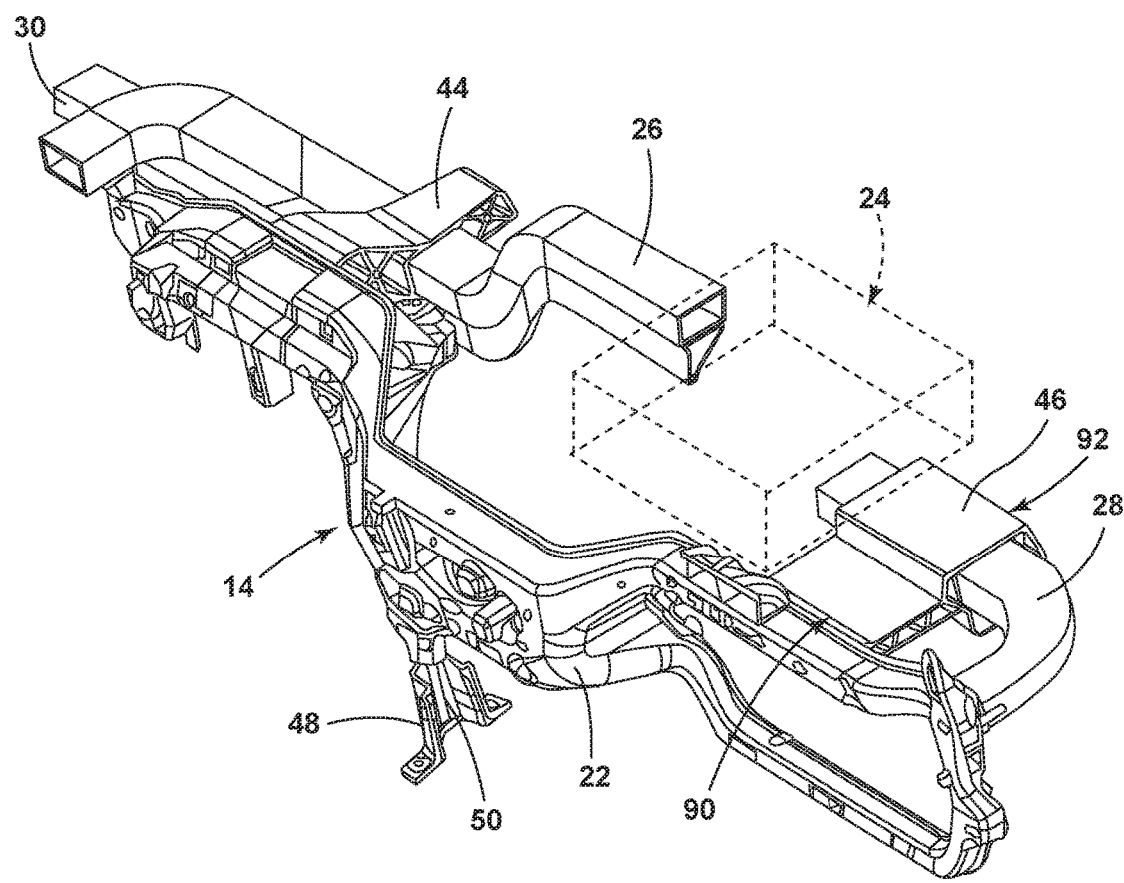
FIG. 3 is a perspective view of a vehicle rearward side of a cross-car beam and a portion of a heating, ventilation, air conditioning (HVAC) unit, according to some examples.
Figure 6:
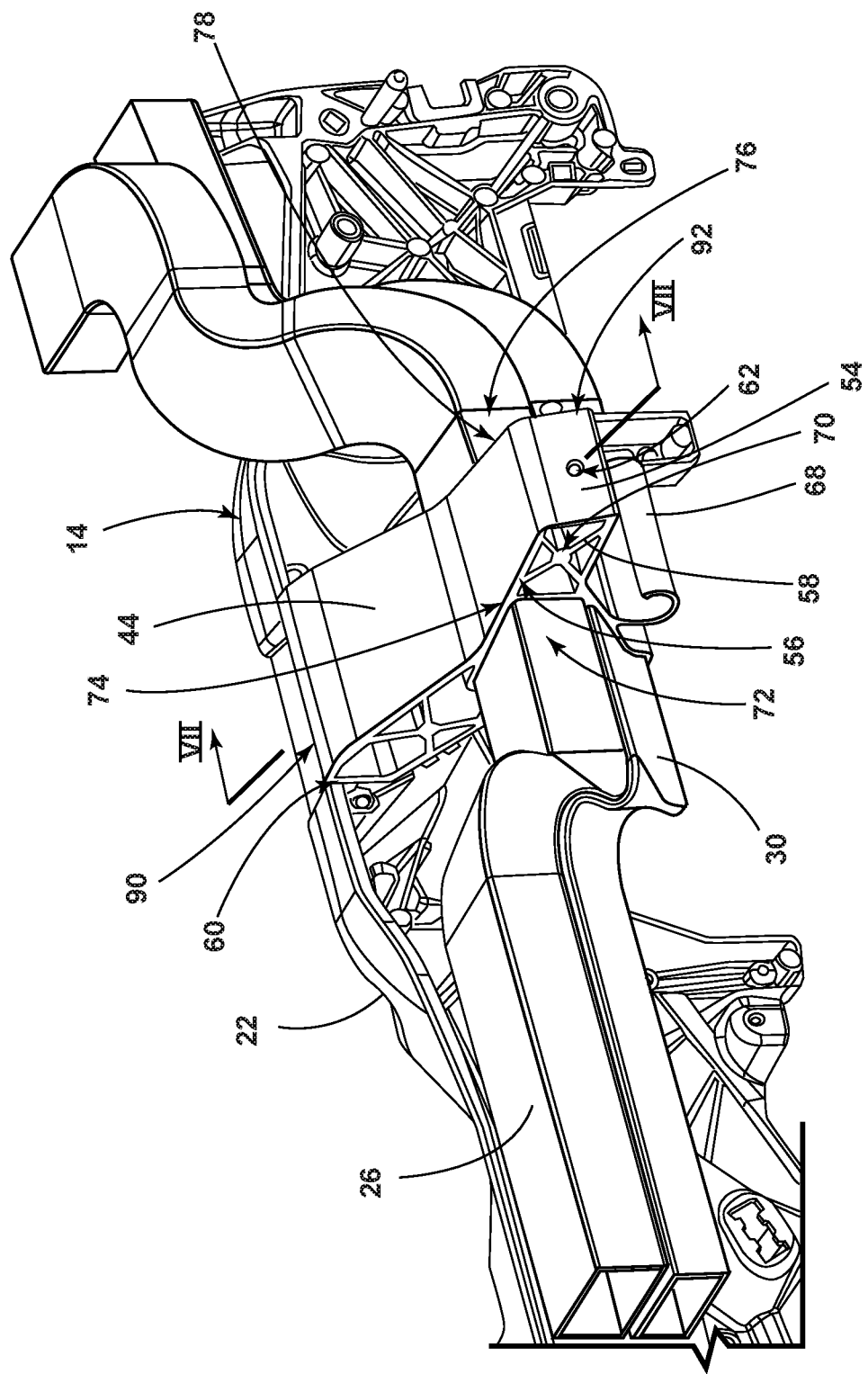
FIG. 6 is a perspective view of the vehicle forward side of the cross-car beam and the first bracket, according to some examples.

Referring to FIGS. 2 and 3, the cross-car beam 14 may include a support beam 50, which may be operably coupled with a vehicle floor bracket 48, in a central portion of the elongated panel 22. In the depicted examples, the elongated panel 22 extends transversely across the vehicle 10. The elongated panel 22 may support the instrument panel 12 and/or other loads and may be engaged to a vehicle frame and/or other suitable structures of the vehicle 10. The vehicle floor bracket 48 is disposed below the support beam 50 and is configured to receive the support beam 50.

A first bracket 44 may be disposed on a first side of a vehicle centerline 52, which may generally align with a driver's side of the vehicle 10 in left hand driving vehicle configurations. A second bracket 46 may be disposed on an opposing side of the vehicle centerline 52, which may generally align with a passenger's side of the vehicle 10 in left hand driving vehicle configurations. It will be appreciated, however, that the cross-car beam 14 may be operably coupled to the cowl 42 (FIG. 1), and/or any other vehicle structure, through any number (e.g., one or more) of brackets 44, 46 in any manner or location without departing from the scope of the present disclosure. The first and second brackets 44, 46 may be configured to attach to the elongated panel 22 and the cowl 42.

With further reference to FIGS. 2 and 3, in some examples, the cross-car beam 14 may be formed from a hybrid composite material, such as a nylon resin having chopped carbon fibers and/or chopped glass fibers disposed in the resin. In general, the chopped carbon fibers and/or chopped glass fibers can have enhanced mechanical properties (e.g., toughness, tensile strength, fatigue resistance). The carbon fiber volume fraction and the glass fiber volume fraction may be between about 1% and about 60%, preferably between about 15% and about 40%, and more preferably between about 30% to about 40%. In some examples, the fiber volume fraction may vary along various portions of the cross-car beam 14. In additional examples, areas of the cross-car beam 14 that are anticipated to encounter high stresses are configured to incorporate higher fiber volume fractions of chopped carbon fibers than areas not expected to experience high stresses. In further examples, the various portions of the cross-car beam 14 may incorporate more than two composite materials without departing from the scope of the present disclosure.

In some examples, the fibers employed in the cross-car beam 14 can be composed of materials including carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. The cross-car beam 14 may also incorporate more than one type of fiber. Further, the resins employed in the cross-car beam 14 can include a nylon, a polypropylene, an epoxy, a polyester, a vinyl ester, a polyetheretherketone, a poly (phenylene sulfide), a polyetherimide, a polycarbonate, a silicone, a polyimide, a poly (ether sulfone), a melamine-formaldehyde, a phenol-formaldehyde, and a polybenzimidazole, or combinations thereof. In some examples, the resin of a first portion of the cross-car beam 14 may be different from the resin employed in a second portion of the cross-car beam 14. Further, the volume fraction of the fibers in the resins, preferably the chopped carbon fibers, may be greater in areas subject to higher stress levels than in the rest of the cross-car beam 14.

According to some examples, the cross-car beam 14 may incorporate one or more preformed fiber mats in addition to the portions containing chopped fibers in a resin or resins. The preformed fiber mats may include woven or non-woven fibers that are held together using the same or different resins as employed in the cross-car beam 14. The mats may also incorporate fibers having different dimensions from the fibers employed in the cross-car beam 14. Similarly, the fibers of the mats may be in either a continuous or a chopped configuration. The fibers of the mats may also be composed of a material having the same or a different composition from that of the fibers employed in the cross-car beam 14. The mats may be incorporated in areas of the cross-car beam 14 having high or low fiber volume fractions. Multiple mats may be used and layered in varying orientations in order to further enhance the mechanical properties of the cross-car beam 14 at particular locations. Exemplary locations in the cross-car beam 14 for placement of the mats include, but are not limited to a steering column mounting area, an airbag assembly opening, a glove box opening, and other locations anticipated to experience higher stress levels compared to stresses in other areas of the cross-car beam 14.

Figure 7:
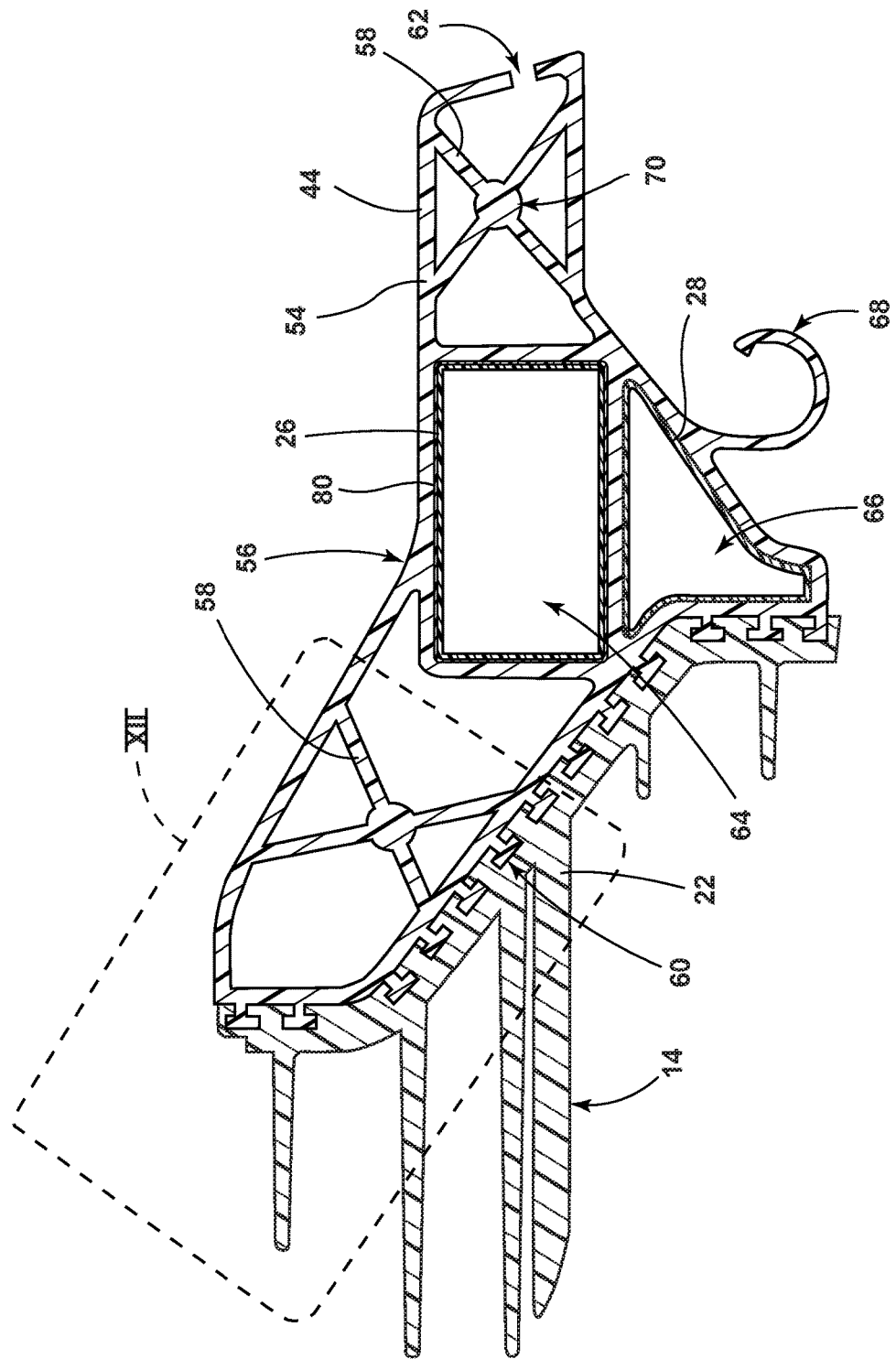
FIG. 7 is a cross-sectional view taken along the line VII-VII of FIG. 6.
Figure 8:
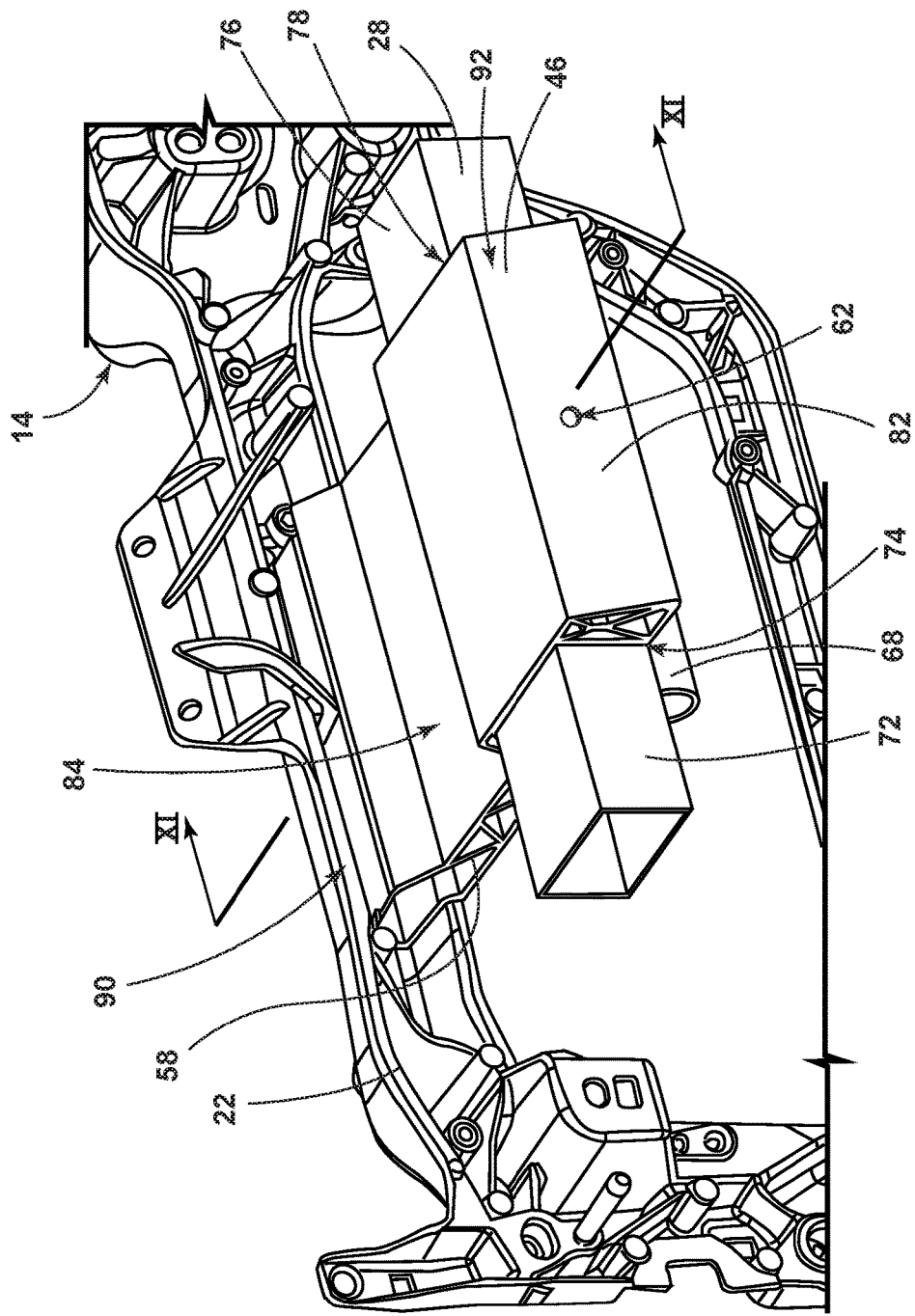
FIG. 8 is a perspective view of a vehicle forward side of the cross-car beam and a second bracket coupled to the cross-car beam, according to some examples.

Referring to FIGS. 4-7, the first bracket 44 includes a first housing 54. The first housing 54 may include a substantially closed outer periphery 56. The first housing 54 may include various features within the first housing 54. For example, the first housing 54 may include one or more ribs 58, an attachment feature 60, a cowl attachment structure 62, a first opening 64, a second opening 66, and/or a wiring harness retainer 68. The ribs 58 may be integrally formed with the first housing 54. In some examples, the ribs 58 may be disposed in cross-linked patterns, as illustrated in FIG. 7. In cross-linked examples, an intersection portion 70 of two or more ribs 58 may have a thickness that is larger than the thickness of the ribs 58. Moreover, due to the concealment of the first bracket 44, once the instrument panel 12 is assembled within the vehicle 10, the ribs 58 may be of a thickness that causes sink within a surface of the outer periphery 56 of the bracket 44. It will be appreciated that the ribs 58 may be of any orientation without departing from the scope of the present disclosure.

As will be described in greater detail below, the attachment feature 60 may be integrally formed with the first bracket 44. In some examples, the attachment feature 60 may be configured as interlocking features that correspond with an attachment assembly on the elongated panel 22. It will be appreciated, however, that the first bracket 44 may additionally, and/or alternatively, be operably coupled to the elongated panel 22 through fasteners, welding, and/or adhesives without departing from the scope of the present disclosure.

The cowl attachment structure 62 is utilized for coupling the first bracket 44 to the cowl 42. In some examples, the cowl attachment structure 62 may be a void that is defined by the first housing 54. A fastener may be disposed through the void and attached to the cowl 42. It will be appreciated, however, that any type of fastener, adhesive, and/or other device may be used to coupled the first bracket 44 to the cowl 42 without departing from the scope of the present disclosure.

With further reference to FIGS. 4-7, a first duct 26 may be operably coupled with the HVAC unit 24 and the air vents (FIG. 1) on outboard portions of the instrument panel 12. A second duct 28 may be operably coupled to the HVAC unit 24 and the demister outlets 36, which may be disposed within the instrument panel 12 or otherwise disposed within the vehicle 10. The first and second ducts 26, 28 may pass through respective openings 64, 66 within the first bracket 44. As illustrated in FIG. 7, the first duct 26 passes through a first, upper opening 64 and the second duct 28 passes through a second, lower opening 66. It will be appreciated, however, that any opening 64, 66 may be in any location of the first bracket 44. In some examples, both the first and second ducts 26, 28 may pass through a common opening 64. In some instances, a first portion 72 of the duct 26 may operably couple to a first side 74 of the first bracket 44 and a second portion 76 of the duct 26 may couple to a second side 78 of the first bracket 44. Accordingly, the first and/or second openings 64, 66 may form a portion of the duct 26 rather than allowing the duct 26 to pass therethrough.

A noise, vibration, and/or harshness (NVH) material 80 may be disposed between the housing 54 and the first and/or second ducts 26, 28. The NVH material 80 may be any component known in the art, including but not limited to, a fibrous tape. By allowing the ducts 26, 28 to pass through openings 64, 66 within the first bracket 44, the first bracket 44 may have a straighter path between the cowl 42 and the elongated panel 22. Furthermore, the first bracket 44 need not be designed to go around the ducts 26, 28, a wiring harness, a module attachment, etc. Moreover, the ducts 26, 28 may have a smoother transition from the HVAC unit 24 to an outboard region of the instrument panel 12. The straighter path may reduce pressure drop when compared to duct systems currently available, which reduces noise generated by moving the conditioned air and/or increases airflow of the HVAC unit 24.

Referring still to FIGS. 4-7, the wiring harness retainer 68 may be integrally formed with the first bracket 44. The wiring harness retainer 68 may be provided to secure a component or a plurality of components such as electrical wires or a vehicle wiring harness to the wiring harness retainer 68. As illustrated in FIG. 7, the wiring harness retainer 68 may be configured as an upwardly opening clip. However, the wiring harness retainer 68 may be configured in any manner without departing from the scope of the present disclosure.

Referring to FIGS. 8-11, the second bracket 46 is formed from a second housing 82 that may also have closed outer periphery 84. The second housing 82 includes the ribs 58, the attachment feature 60, the cowl attachment structure 62, the first opening 64, the wiring harness retainer 68, a passenger airbag attachment 86, and/or a passenger airbag recess 88. The passenger airbag attachment 86 may be configured to attach to a passenger airbag housing that surrounds an undeployed passenger airbag. The passenger airbag recess 88 may partially surround the passenger airbag and the second bracket 46 may support the passenger airbag during deployment. The ribs 58 may be integrally formed with the second housing 82. It will be appreciated that the second bracket 46 may be made in accordance with any of the features described in relation to the first bracket 44 without departing from the scope of the present disclosure.

As provided in reference to the first bracket 44, the second housing 82 may include one or more openings 64 for ducts. Moreover, the ducts 30 may pass through the opening 64 and/or be attached to the second housing 82 with the opening 64 forming a portion of the duct 30.

A plurality of ribs 58 extends between various portions of the outer periphery 84 of the second housing 82. In some examples, the ribs 58 may extend in offset directions from the outer periphery 84. The ribs 58 are configured to provide rigidity and stiffness to the second bracket 46 and the cross-car beam 14, once the second bracket 46 is coupled to the elongated panel 22 and the cowl 42, or any other portion of the vehicle 10.

Referring still to FIGS. 8-11, the second bracket 46 may include the attachment feature 60 on a vehicle rearward side 90 of the second bracket 46, which may be opposite the cowl attachment structure 62, which may be on a vehicle forward side 92. Moreover, the attachment feature 60 may be disposed on an upper surface of the vehicle rearward side 90 and/or integrally formed therewith. The elongated panel 22 may include a corresponding integrally formed attachment assembly that interlocks to attach the second bracket 46 and the elongated panel 22 to one another. It will be appreciated, however, that any other device or material for coupling the second bracket 46 to the elongated panel 22 may be used in conjunction with, or in lieu of, the attachment feature 60 and/or the attachment assembly without departing from the scope of the present disclosure.

Figure 11:
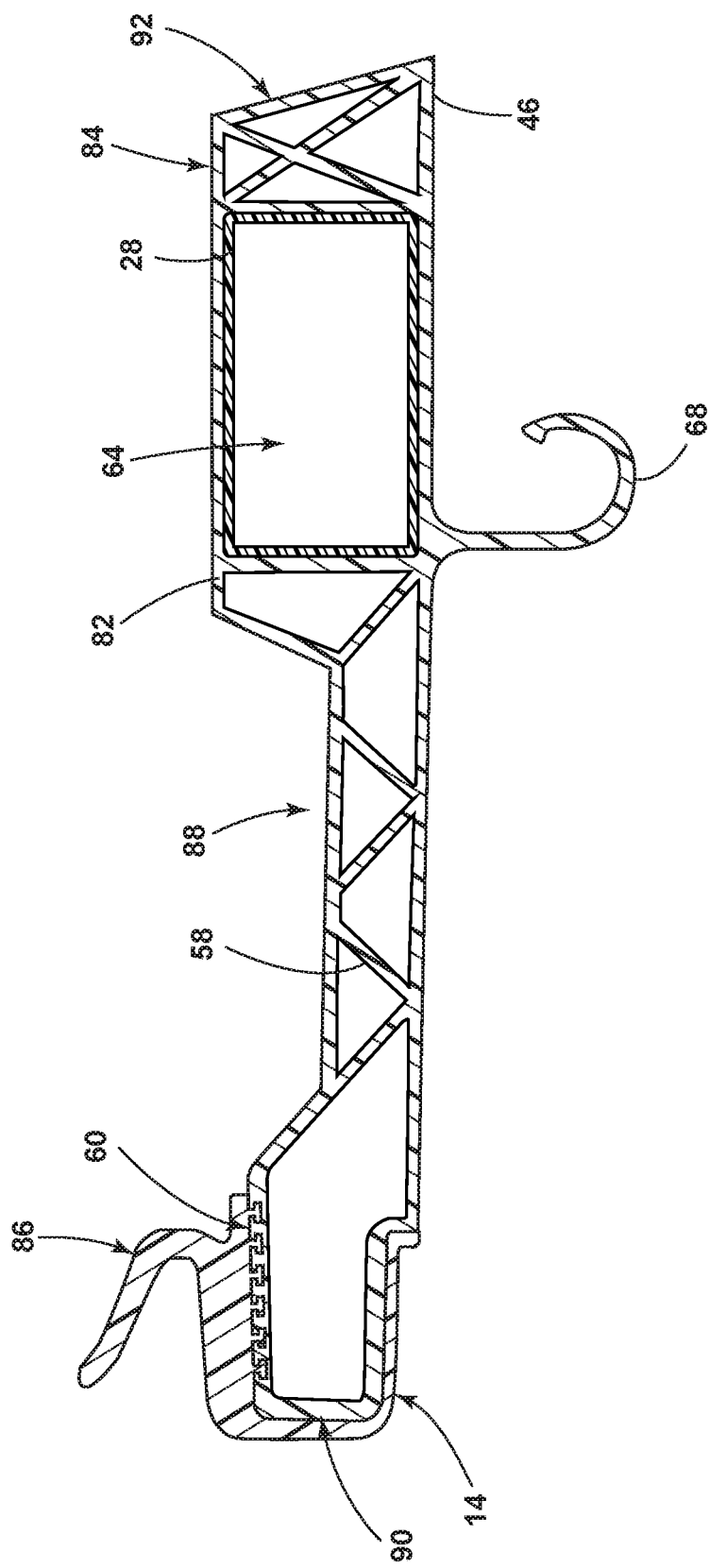
FIG. 11 is a cross-sectional view of the cross-car beam and the second bracket taken along the line XI-XI of FIG. 8.

With further reference to FIGS. 8-11, similar to the first bracket 44, the wiring harness retainer 68 may be integrally formed with the second bracket 46. The wiring harness retainer 68 68 may be provided to secure a component or a plurality of components such as electrical wires or the vehicle wiring harness to the wiring harness retainer 68. As illustrated in FIG. 11, the wiring harness retainer 68 may be configured as an upwardly opening clip. However, the wiring harness retainer 68 may be configured in any manner without departing from the scope of the present disclosure.

Figure 12:
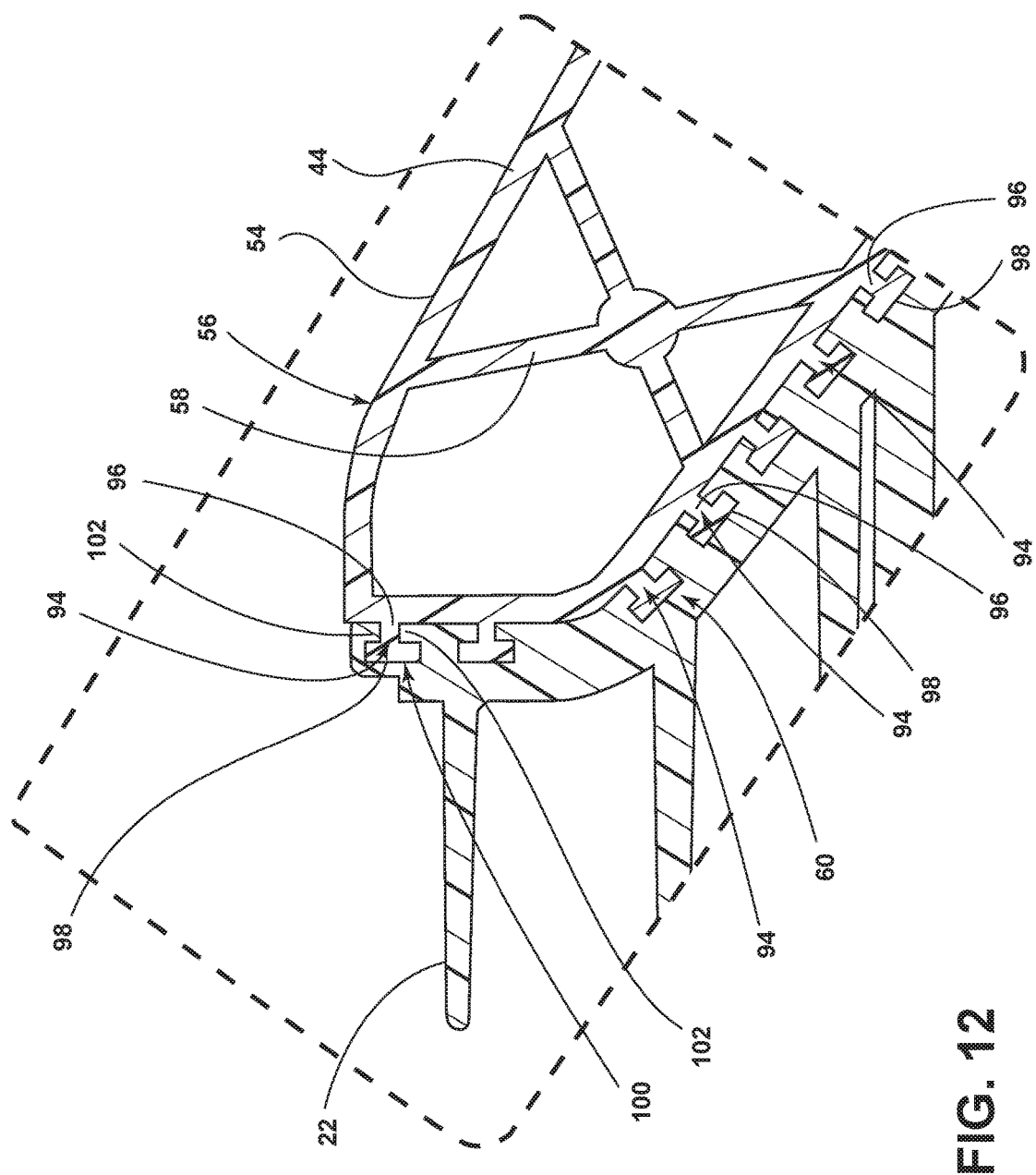
FIG. 12 is an enhanced view of area XII of FIG. 7.

Referring to FIG. 12, the first and second brackets 44, 46 each may have the attachment feature 60, which may interlock the first and second brackets 44, 46 with the attachment assembly integrally formed with the elongated panel 22. It will be appreciated, however, that the attachment feature 60 and/or the attachment assembly may be formed as independent components that are then coupled with the first bracket 44, the second bracket 46, and/or the elongated panel 22.

In some examples, the attachment feature 60 is configured as one or more members 94 that protrude from the first and second housings 54, 82. Each member 94 may include a base section 96 and an engagement section 98. In some instances, the base section 96 and the engagement section 98 are both of a rectangular geometry. Moreover, the engagement section 98 may extend transversely from the base section 96.

The attachment assembly is disposed along the various portions of the elongated panel 22 and is configured to correspond with the attachment features 60 on the first and second housings 54, 82. In some examples, grooves 100 are defined between a pair of opposing guides 102. The one or more grooves 100 receive the members 94 of the first and/or second brackets 44, 46 to interlock the same with the elongated panel 22 in a fixed manner. It will be appreciated that the members 94 and the groove guide 102 shapes shown are merely examples. In alternate examples, any practicable shape may be utilized without departing from the scope of the present disclosure.

As provided herein, the first and second housings 54, 82 may be formed through an extrusion process, a pultrusion process, and/or any other process known in the art. The attachment feature 60 may be integrally formed with the first and second housings 54, 82. Similarly, the elongated panel 22 may be formed through an extrusion process, a pultrusion process, an injection molding process, and/or any other process known in the art. The attachment assembly may be integrally formed with the elongated panel 22. During the buildup of an instrument panel 12, the cross-car beam 14 may be temporarily mounted within a simple steel build fixture (not shown). The first and second brackets 44, 46 described herein are attached to the elongated panel 22 through interlocking the attachment feature 60 with the attachment assembly on the elongated panel 22. The interlocking features in the first and second brackets 44, 46 position the first and/or second brackets 44, 46 in a predefined spatial orientation and location features included in the build fixture aid an operator in selecting the proper position along the length of the elongated panel 22. Once properly located, the first and/or second brackets 44, 46 are positionally fixed to the elongated panel 22. The groove 100 and extruded interlocking feature arrangement of the present disclosure provide both rotational and load bearing support for the first and second brackets 44, 46 as well as reducing or eliminating component vibration, squeaks and rattling. Alternate methods of fixing the first and/or second brackets 44, 46 to the elongated panel 22 include interference fits between the first and second brackets 44, 46 and the elongated panel 22, mechanical fasteners, adhesives and/or welding. The completed instrument panel 12 is then installed in the vehicle 10, as provided herein.

Referring to FIGS. 4-12, the first and second brackets 44, 46 may each be formed from a composite material that includes any base material provided herein and/or known in the art along with any fiber material described herein and/or known in the art. It is contemplated that the first and second brackets 44, 46 may be formed through pultrusion or extrusion. With respect to the examples of the first and second brackets 44, 46 that are formed through pultrusion or extrusion, the first and second brackets 44, 46 may include a highly oriented carbon fiber reinforced with a polymer such as, but not limited to, nylon or polypropylene. In some examples, the first and second brackets 44, 46 and the elongated panel 22 may each include a polypropylene resin therein such that NVH may be minimized when the elongated panel 22 and the first and/or second brackets 44, 46 are coupled to one another. The pultruded or extruded composites used to form the first and second brackets 44, 46 may be isotropic and benefit from having a high Young's modulus and a wide array of possible geometries. Accordingly, it is contemplated that other pultruded or extruded composites may provide greater stiffness in high-stress areas and design flexibility.

As described herein, pultruded or extruded composites may be formed in a variety of geometries. For example, the first and second housings 54, 82 may each respectively have closed outer peripheries 56, 84. The closed outer peripheries 56, 84 may provide additional strength and/or rigidity to the first and second brackets 44, 46. The closed outer peripheries 56, 84 may not be possible to form through injection molding processes. In some examples, the wiring harness retainer 68, the ribs 58, the attachment feature 60, and/or any other features may extend in a common direction as the first and/or second housing 54, 82 such that each component may be integrally formed during a pultrusion and/or extrusion process. Moreover, fibers within the first and second housings 54, 82 may be oriented in a predetermined direction during these processes to increase the rigidity of the first and second brackets 44, 46 in predetermined locations.

Accordingly, a cross-car beam for a vehicle has been advantageously provided herein. The cross-car beam includes one or more brackets coupled to an elongated panel for supporting a substrate of an instrument panel. The one or more brackets may be formed through pultrusion or extrusion, and as such, may be shaped in a multitude of geometries. It is contemplated that the first and second brackets and/or the elongated panel may be formed from a composite material to provide rigidity in high-stress areas. In such an arrangement, the cross-car beam confers weight savings without sacrificing structural integrity. Furthermore, the cross-car beam benefits from greater design flexibility over conventional offerings. The cross-car beam may be manufactured at low costs when compared to standard vehicle cross-car beam assemblies.

According to various examples, a cross-car beam is provided herein. The cross-car beam includes a composite elongated panel extending across a vehicle. A bracket is operably coupled with the elongated panel. An attachment feature and a cowl attachment structure are each integrally formed with the bracket and are disposed at opposing end portions of the bracket. Examples of the cross-car beam can include any one or a combination of the following features:

the composite elongated panel includes a chopped carbon fiber reinforced with a polymer and the bracket includes a woven or continuous carbon fiber reinforced with a polymer;

the polymer includes nylon or polypropylene;

the bracket is formed through pultrusion or extrusion and is insertion molded to the elongated panel;

the bracket is disposed on a driver's side of a vehicle centerline;

the bracket is disposed on a passenger's side of a vehicle centerline;

the bracket includes a housing having a closed outer periphery;

integrally formed ribs is disposed within the housing;

a wiring harness retainer integrally formed with the bracket;

the bracket defines a first opening and a first duct passes through the first opening;

the bracket defines a second opening below the first opening and a second duct passes through the second opening; and/or a first portion of the first duct operably couples to a first side of the bracket and a second portion of the first duct operably couples to a second side of the first duct.

Moreover, a method of manufacturing a cross-car beam for a vehicle is provided herein. The method includes forming a composite elongated panel configured to extend across a vehicle. a bracket is operably coupled with the elongated panel. an attachment feature and a cowl attachment structure are integrally formed with the bracket and disposed at opposing end portions of the bracket. Examples of the method of manufacturing a cross-car beam for a vehicle can include any one or a combination of the following features:

the operably coupling a bracket with the elongated panel step includes pultruding the bracket; and/or the operably coupling a bracket with the elongated panel step includes extruding the bracket.

According to some examples, a cross-car beam is provided herein. The cross-car beam includes a composite elongated panel extending across a vehicle. A first bracket is operably coupled with an elongated panel on a first side of a vehicle centerline. A second bracket is operably coupled with the elongated panel on a second side of a vehicle centerline. The first and second brackets include respective first and second housings each having a closed outer periphery. Examples of the cross-car beam can include any one or a combination of the following features:

the composite elongated panel includes a chopped carbon fiber reinforced with a polymer and the first and second brackets include a woven or continuous carbon fiber reinforced with a polymer;

the first and second brackets are formed through pultrusion or extrusion; and/or the first and second brackets each include integrally formed ribs disposed within the respective first and second housings.

According to other examples, a vehicle cross-car beam bracket is provided herein. The vehicle cross-car beam bracket includes a housing having a closed outer periphery. An attachment feature and a cowl attachment structure are each integrally formed with the housing and are disposed at opposing end portions of the housing. Integrally formed ribs are disposed within the housing. A first opening is defined by the housing and is configured to accept a duct therethrough. Examples of the vehicle cross-car beam bracket can include any one or a combination of the following features:

the housing includes a woven or continuous carbon fiber reinforced with a polymer;

a first portion of the duct operably couples to a first side of the bracket and a second portion of the duct operably couples to a second side of the duct; and/or a wiring harness retainer integrally formed with the housing.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A cross-car beam comprising:
   a composite elongated panel extending across a vehicle;
   a bracket operably coupled with the elongated panel, the bracket defining a first opening and a second opening through which a first duct and a second duct respectively pass through; and
   an attachment feature and a cowl attachment structure each integrally formed with the bracket and disposed at opposing end portions of the bracket.

2. The cross-car beam of claim 1, wherein the composite elongated panel includes a chopped carbon fiber reinforced with a polymer and the bracket includes a woven or continuous carbon fiber reinforced with a polymer.

3. The cross-car beam of claim 2, wherein the polymer includes nylon or polypropylene.

4. The cross-car beam of claim 1, wherein the bracket is formed through pultrusion or extrusion and is insertion molded to the elongated panel.

5. The cross-car beam of claim 1, wherein the bracket is disposed on a driver's side of a vehicle centerline.

6. The cross-car beam of claim 1, wherein the bracket is disposed on a passenger's side of a vehicle centerline.

7. The cross-car beam of claim 1, wherein the bracket includes a housing having a closed outer periphery.

8. The cross-car beam of claim 7, further comprising:
   integrally formed ribs are disposed within the housing.

9. The cross-car beam of claim 1, further comprising:
   a wiring harness retainer integrally formed with the bracket.

10. A cross-car beam comprising:
    a composite elongated panel extending across a vehicle;
    a bracket operably couple with the elongated panel, the bracket defining a first opening;
    a first duct passing through the first opening, wherein a first portion of the first duct operably couples to a first side of the bracket and a second portion of the first duct operably couples to a second side of the first duct.

* * * * *